United States Patent [19]

Capell, Sr. et al.

[11] Patent Number: 5,483,500
[45] Date of Patent: Jan. 9, 1996

[54] SIGNAL PROCESSING SYSTEM AND METHOD FOR USE IN MULTIBEAM SENSING SYSTEMS

[75] Inventors: William J. Capell, Sr., Westwood; Christos Zabounidis, North Grafton, both of Mass.; Kushal K. Talukdar, North Providence, R.I.

[73] Assignee: SeaBeam Instruments Inc., East Walpole, Mass.

[21] Appl. No.: 167,365

[22] Filed: Dec. 16, 1993

[51] Int. Cl.⁶ ..................................................... G01S 3/80
[52] U.S. Cl. ........................... 367/119; 367/124; 367/129; 367/905
[58] Field of Search ............................. 367/21, 119, 124, 367/125, 126, 129, 905; 324/25

[56] References Cited

U.S. PATENT DOCUMENTS

| | | | |
|---|---|---|---|
| 5,043,951 | 8/1991 | Gilmour et al. | 367/126 |
| 5,319,554 | 6/1994 | Padhi | 364/421 |

OTHER PUBLICATIONS

"Line–Array Beamforming Using Linear Prediction for Aperture Interpolation and Extrapolation", David N. Swingler and Robert S. Walker, IEEE Transactions on Acoustics, Speech, and Signal Processing, vol. 37, No. 1, Jan. 1989.
"Short Notes on the Calculation of Filter Coefficients for Maximum Entropy Spectral Analysis", N. Andersen, Geophysics, vol. 39, No. 1, Feb., 1974.

Primary Examiner—J. Woodrow Eldred
Attorney, Agent, or Firm—Neil A. Steinberg

[57] ABSTRACT

The present invention is a system and technique for reducing the effective beam width of a receive beam for a sensing system, for example a sonar or radar system. The sensing system includes a plurality of physical sensors each for measuring a receive signal wherein each receive signal includes a first and second data processing unit. The sensing system may include means for computing sensor data for at least one extrapolated-sensor, including, first extrapolation means for computing a first extrapolated-sensor data unit of the at least one extrapolated-sensor by extrapolation of a first data processing unit of the plurality of physical sensors, and second extrapolation means for computing a second extrapolated-sensor data unit of the at least one extrapolated-sensor by extrapolation of a second data processing unit of the plurality of physical sensors. The system may also include means for combining the first and second extrapolated-sensor data units of the at least one extrapolated-sensor to the first and second data processing units of the plurality of physical sensors to thereby generate a narrower effective beam width of a receive beam.

42 Claims, 8 Drawing Sheets

SIGNAL PROCESSING SYSTEM AND METHOD FOR USE IN MULTIBEAM SENSING SYSTEMS

BACKGROUND OF THE INVENTION

This invention relates to systems and techniques involving signal processing in single or multibeam sensing systems, and, more particularly, to systems and techniques involving signal processing of receive signals in single or multibeam sonar, radar and lidar (laser based radar systems) systems.

Briefly, by way of background, a sonar system may be used to detect, navigate, track, classify and locate objects in water using sound waves. Defense and civilian applications of sonar systems are numerous. In military applications, underwater sound is used for depth sounding; navigation; ship and submarine detection, ranging, and tracking (passively and actively); underwater communications; mine detection; and or guidance and control of torpedoes and other weapons. Most systems are monostatic, but bistatic systems may also be employed.

Civilian applications of underwater sound detection systems are numerous as well. These applications are continuing to increase as attention is focused on the hydrosphere, the ocean bottom, and the sub-bottom. Civilian applications include depth sounding; bottom topographic mapping; object location; underwater beacons (pingers); wave-height measurement; doppler navigation; fish finding; sub-bottom profiling; underwater imaging for inspection purposes; buried-pipeline location; underwater telemetry and control; diver communications; ship handling and docking aid; anti-stranding alert for ships; current flow measurement; and vessel velocity measurement.

A typical active sonar system includes a transmitter (a transducer commonly referred to as a "source" or "projector") to generate the sound waves and a receiver (a transducer commonly referred to as a "hydrophone") to sense and measure the properties of the reflected energy ("echo") including, for example, amplitude and phase. In a typical multibeam sonar system, a first transducer array ("transmitter or projector array") is mounted along the keel of a ship and radiates sound. A second transducer array ("receiver or hydrophone array") is mounted perpendicular to the transmitter array. The receiver array receives the "echoes" of the transmitted sound pulse, i.e., returns of the sound waves generated by the transmitter array. A conventional sonar system and transmitter and receiver array configuration is disclosed in Lustig et al., U.S. Pat. No. 3,114,631.

In those instances where the transmitter array is mounted along the keel of the ship, the transmitter array projects a fan-shaped sound beam which is narrow in the fore and aft direction but wide athwart ship. The signals received by the hydrophones in the receiver array are summed to form a receive beam which is narrow in the across track but wide in the along track direction. The intersection of the transmit and receive beams define the region in the sea floor from where the echo originated. By applying different time delays to the different hydrophones signals the receive beams can be steered in different directions and when a number of receive beams are formed simultaneously they together with the transmit beam define the multibeam sonar geometry.

When the transmitted sound from the transmitter array is of a single frequency, the time delays can be translated into phase delays for beamforming the hydrophone signals from the receiver array. For a given frequency, the narrow width of the receive beam is governed by the number of hydrophones comprising the receiver array (i.e., the physical length of the receiver array) and the direction to which the beam is steered. A common rule of thumb for determining the receive beam width (in degrees) is $$bw = \frac{51\lambda}{a\cos\theta}$$

where:
 (1) "a" is the length of the array;
 (2) "λ" is the wavelength (determined by the frequency of the sound wave of the projector) in the same units as "a" (the length of the array); and
 (3) "θ" is the direction of the beam steer.

Thus, it can be seen that for narrower beam widths the length of the receiver array should be larger. Stated simply, a "narrower" beam width of the receiver beam increases the information that may be obtained about the reflecting objects, e.g., object resolution, accuracy of object direction, and range coverage. However, in many applications of multibeam sonars, the physical characteristics of the receiver array are constrained by the physical characteristics of the ship. For example, in many instances where the receiver arrays are mounted athwart ship for multibeam sonars, the maximum physical length of the array is restricted by the width of the ship. The physical characteristics of the receiver array may also be restricted as a result of the draft of the ship being constrained. This tends to confine the depth of the receiver array and may require segmentation of the receiver array.

Further, in many instances maintaining the structural integrity of the keel of the ship may impact upon the physical characteristics of the receiver array. Maintaining the structural integrity of the keel is important for those ships employed as "ice-breakers". In this situation, the hydrophone array may not be installed athwart ship as a single unit. Instead, the receiver array may be divided into two or more sub-arrays each array conforming to the hull of the ship. However, installing the receiver array as two or more sub-arrays, without a continuous locus of data athwart ship for multibeam sonars, may cause an increase in the beam pattern distortions, e.g., an increase in the side lobes of the calculated receive beam.

There exists a need for a signal processing system and technique to reduce the effective beam width of the receive beam without increasing the physical dimensions of the array. Further, there exists a need for a signal processing system for a sonar system that overcomes many typical constraints imposed upon the structural characteristics of the receiver array.

SUMMARY OF THE INVENTION

In a first principal aspect, the present invention is a technique and system for reducing the effective beam width of a receive beam for a sensing system, for example a sonar or radar system. The sensing system includes a plurality of physical sensors each for measuring a receive signal wherein each receive signal includes a first and second data processing unit.

The sensing system further includes means for computing sensor data for at least one extrapolated-sensor, including, first extrapolation means for computing a first extrapolated-sensor data unit of the at least one extrapolated-sensor by extrapolation of a first data processing unit of the plurality of physical sensors. In addition, the sensing system includes second extrapolation means for computing a second extrapolated-sensor data unit of the at least one extrapolated-sensor by extrapolation of a second data processing unit of the plurality of physical sensors.

In a preferred embodiment, the system may also include means for combining the first and second extrapolated-sensor data units of the at least one extrapolated-sensor to the first and second data processing units of the plurality of physical sensors to thereby generate a narrower effective beam width of a calculated receive beam.

The first and second data processing units of the receive signals may be, for example, (1) a real (I) and an imaginary part (Q), or (2) a magnitude, i.e., $\sqrt{I^2+Q^2}$, and a phase, i.e., $\tan^{-1}$ (Q/I). In those instances where the data processing units are the real and imaginary part of each receive signal, the system and technique compute a real portion of a receive signal of extrapolated-sensors by extrapolation of a portion, or all, of the real part of the receive signals of the sensor array. In addition, the system and technique compute an imaginary portion of the receive signal of extrapolated-sensors by extrapolation of the imaginary part of the receive signals of the sensor array.

In those instances where the data processing units are the magnitude and phase part of each receive signal, the system and technique compute a magnitude part of a receive signal of extrapolated-sensor by extrapolation of a portion, or all, of the magnitudes of the receive signals of the sensor array. The system and technique compute a phase portion of the receive signal of extrapolated-sensors by extrapolation of the phases of the receive signals of the sensor array.

In a preferred embodiment, the extrapolating means computes extrapolated-sensor data for the extrapolated-sensor using the prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of the extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical array contributing to the calculation of the prediction coefficients $d_k$, k=1 to N, and N<M; and wherein the predictor coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

-continued $$\phi_k = \frac{1}{M-k} \sum_{i=1}^{M-k} y_i Y_{i+k}; \text{ and}$$

k = 0, 1, 2, ..., N.

The predictor coefficients may be calculated using a method presented by Andersen in "On the Calculation of Filter Coefficients for Maximum Entropy Spectral Analysis," Geophysics 39, 1 (1974).

In another principal aspect, the invention is a system and technique for generating a related pair of extrapolated-sensor data units in a sensing system having an array of physical sensors. The array of physical sensors includes a first sub-array of physical sensors and a second sub-array of physical sensors wherein each sub-array includes a plurality of mutually exclusive physical sensors. Each physical sensor of the sub-arrays of physical sensors provides a receive signal including first and second data processing units.

The system and technique include means for computing first extrapolated-sensor data units of a first array of extrapolated-sensors by extrapolation of the first data processing units of the physical sensors of the first sub-array of physical sensors. The system and technique further include means for computing second extrapolated-sensor data units of the first array of extrapolated-sensors by extrapolation of the second data processing units of the first sub-array of physical sensors.

In addition, the system includes means for computing first extrapolated-sensor data units of a second array of extrapolated-sensors by extrapolation of the first data processing units of the second sub-array of physical sensors. The system also includes means for computing second extrapolated-sensor data units of the second array of extrapolated-sensors by extrapolation of the second data processing units of the second sub-array of physical sensors.

In one preferred embodiment, the system and technique of this aspect of the invention may include means for computing first and second extrapolated-sensor data of a first extrapolated-sensor using: (1) first and second data processing units of a first composite-sensor sub-array which includes the first and second extrapolated-sensor data units of the first extrapolated-sensor sub-array and at least a portion of the first and second data processing units of the first sub-array of physical sensors, (2) using first and second data processing units of a second composite-sensor sub-array which includes the first and second extrapolated-sensor data units of the second extrapolated-sensor sub-array and at least a portion of the first and second data processing units of the second sub-array of physical sensors.

The means for computing first and second extrapolated-sensor data of the first extrapolated-sensor includes: (1) means for averaging the first data processing units of the first-composite sub-array of sensors and the second-composite sub-array of sensors using weighted averages; and (2) means for averaging the second data processing units of the first-composite sub-array of sensors and the second-composite sub-array of sensors using weighted averages. In one embodiment, these weighted averages may be based upon the number of sensors in the first and the second composite sub-arrays.

In a preferred embodiment, the first and second sub-arrays are arranged in a sloped configuration. The first extrapolated-sensor sub-array is representative of sensor data at the converging end of the first physical sub-array and the second extrapolated-sensor sub-array is representative of sensor data at the converging end of the second physical sub-array such that the data of the first and second composite subarrays data provide a separation, at the converging ends, of an amount equal to the spacing of a physical hydrophone. Further, the first and second extrapolated-sensor data units are representative of sensor data corresponding to sensors positioned between the first and second physical sub-arrays.

In a preferred embodiment, the system and technique include means for detecting inaccurate sensor data of a sensor physically positioned between the first and second sensor arrays, and for substituting the computed first and second extrapolated-sensor data units of the first extrapolated-sensor for the inaccurate sensor data.

In another preferred embodiment of this aspect of the invention, the system sensing system is a multibeam bathymetric, imaging or stereoscopic sonar system.

In yet another principal aspect, the present invention is a sensing system and technique for computing extrapolated-sensor data units for a sensing system having an array of physical sensors. The array of physical sensors includes a sub-array of physical-sensors wherein the sub-array includes a plurality of physical sensors. Each physical sensor of the sub-array provides a receive signal including a first data processing unit and a second data processing unit.

The system and technique include extrapolation computing means for computing the extrapolated-sensor data, the computing means includes: first computing means for computing a first extrapolated-sensor data unit of a first extrapolated-sensor by extrapolation of the first data processing unit of the sensors of the sub-array of physical sensors. The extrapolation computing means also includes second computing means for computing a second extrapolated-sensor data unit of the first extrapolated-sensor by extrapolation of the second data processing unit of the sub-array of physical sensors.

In a preferred embodiment, the extrapolation computing means according to this aspect of the invention computes the extrapolated-sensor data units using a prediction equation of:

$$y_n = \sum_{k=1}^{N} d_k y_{n-k}$$

where:

N=the order of the filter;

$Y_n$=the value of the extrapolated processing unit;

$Y_{n-k}$=the value of the extreme points of the physical and/or previously extrapolated processing unit in the direction of the extrapolation;

$d_k$=the $N^{th}$ order predictor coefficients that predict the next value $Y_n$ of the spatial series from the previous N values $Y_{n-k}$, k=1 to N of the extreme physical and/or extrapolated processing units;

M=the number of physical sensors in the physical array contributing to the calculation of the prediction coefficients $d_k$, k=1 to N, and N<M; and wherein the predictor coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

-continued where:

$$\phi_k = \frac{1}{M-k} \sum_{i=1}^{M-k} y_i Y_{i+k}; \text{ and}$$

k = 0, 1, 2, ..., N.

In another preferred embodiment, the system further includes means for detecting inaccurate sensor data from a physical sensor positioned at a distal end of the sub-array of physical-sensors and for substituting the computed first and second extrapolated-sensor data units of the first extrapolated-sensor for the inaccurate sensor data.

In yet another preferred embodiment, the extrapolation computing means may further include means for computing a first extrapolated-sensor data unit of a second extrapolated-sensor by extrapolation of the first extrapolated-sensor data unit of the first extrapolated-sensor and the first data processing units of at least a portion of the sensors of the sub-array of physical sensors. The extrapolating computing means also computes a second extrapolated-sensor data unit of the second extrapolated-sensor by extrapolation of the second extrapolated-sensor data unit of the first extrapolated-sensor and at least a portion of the second data processing units of the sub-array of physical sensors.

BRIEF DESCRIPTION OF THE DRAWINGS

In the course of the detailed description of preferred embodiments to follow, reference will be made to the attached drawings, in which.

DESCRIPTION OF THE PREFERRED EMBODIMENTS

Figure 1:
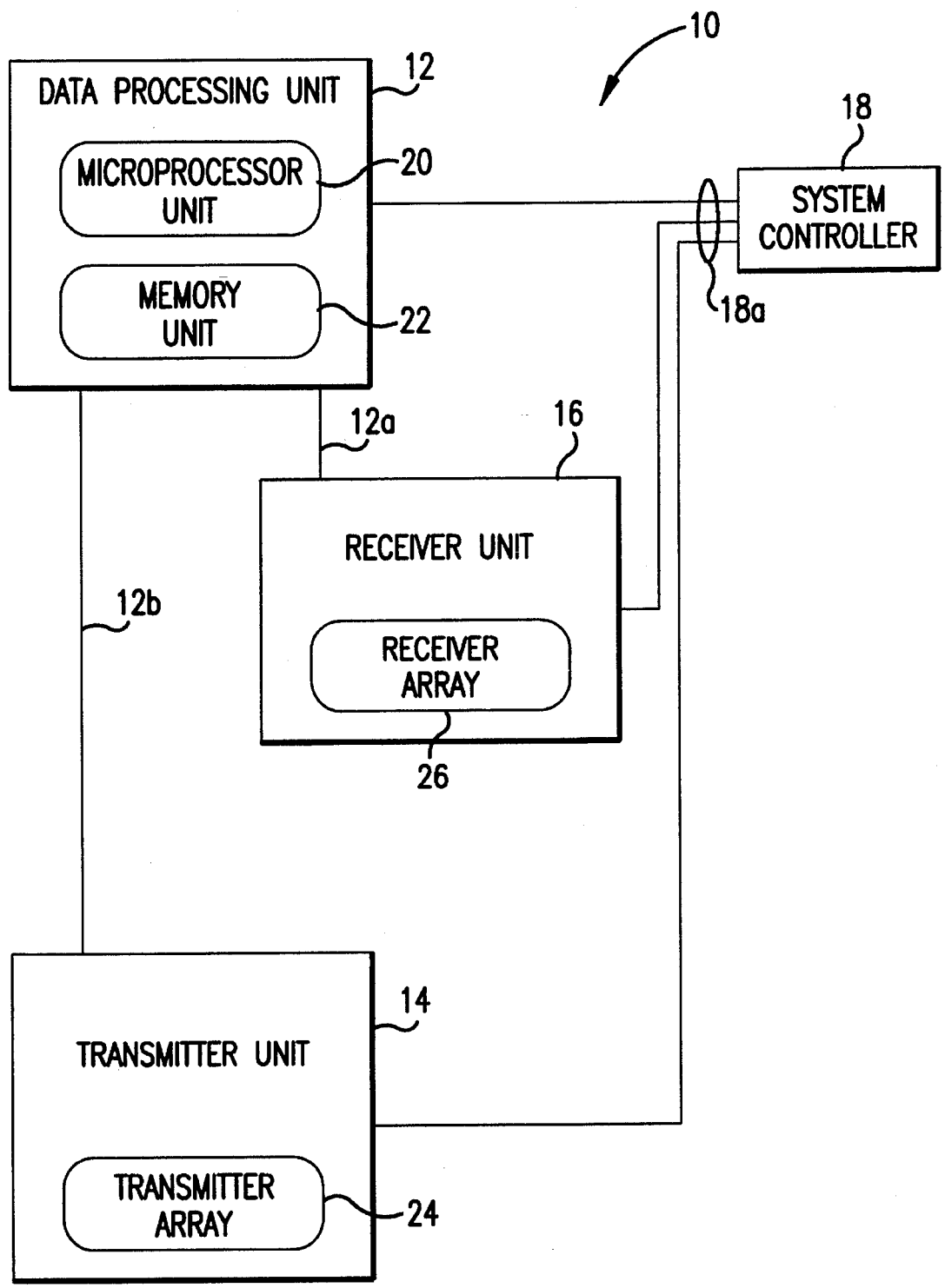
FIG. 1 is a schematic block diagram representation of a sonar system including a signal processing system according to the present invention.

The present invention is a signal processing system and technique for use in active and passive single and multibeam sensing systems, for example, a multibeam sonar, radar, and lidar systems. The present invention is described below in the environment of an active multibeam sonar system. It will be appreciated by those skilled in the art that the invention may be implemented in passive sonar systems as well as other types of active and/or passive sensing systems, for example, radar and lidar systems.

The signal processing technique and system of the present invention employ data from the physical sensing elements of the receiver array to extrapolate and, in some instances, effectively interpolate data representative of "pseudo" sensing elements. The extrapolation technique is used to generate extrapolation data for pseudo-hydrophones positioned at various points along the receiver array. The extrapolated data may replace receive signal data from inoperative hydrophones which are generating erroneous or inaccurate data. In that instance, the extrapolated data may substitute or replace the inaccurate data.

Briefly, the sonar system includes a physical array of sensors, for example, hydrophones. In a preferred embodiment, this technique measures a receive signal for each sensor of the array of physical sensors. These signals may be described as a related pair of data processing units, for example, ( 1 ) a real part ( I ) and an imaginary part (Q) of the signal, or (2) a magnitude, i.e., $\sqrt{I^2+Q^2}$, and a phase, i.e., $\tan^{-1}$ (Q/I) of the signal. Each receive signal may also be described as a complex signal (i.e., I+jQ).

In a preferred embodiment, the system and technique employ the real and imaginary part of the receive signals to compute the extrapolation data. In particular, the system and technique of the present invention compute a real portion of a receive signal of extrapolated-sensors by extrapolation of the real part of the receive signals of the sensor array. Further, the system and technique compute an imaginary Rortion of the receive signal of extrapolated-sensors by extrapolation of the imaginary part of the receive signals of the sensor array.

In another preferred embodiment, the system and technique may employ the magnitude and phase of the receive signals to compute the extrapolation data. In this embodiment, the system and technique compute a magnitude part of a receive signal of extrapolated-sensors by extrapolation of the magnitudes of the receive signals of the sensor array, as well as a phase portion of the receive signal of extrapolated-sensors by extrapolation of the phases of the receive signals of the sensor array.

The system and technique also may be employed to "effectively" interpolate pseudo-hydrophone data by generating extrapolation-data for a physical sensing element in the receiver array that is providing erroneous or inaccurate information. In this situation, the inoperable hydrophone data is deleted from the data generated by the receiver array thereby leaving an absence of information for that hydrophone location (position) along the receiver array. In effect, the receiver array is segmented into two sub-arrays, each containing a plurality of operable physical sensing elements. The "hole" is filled by extrapolating data from the operable hydrophone data from each sub-array of the receiver array. Both extrapolated values are then used (for example, using weighted averages) to interpolate hydrophone data representative of data corresponding to the position of the inoperable hydrophone.

In this situation, generating data to substitute for the inaccurate data will provide the system with a continuous locus of reliable data values along the receiver array and thereby avoid an increase in the beam pattern distortions, e.g., an increase in the side lobes of the receive beam.

With reference to FIG. 1, a sonar system 10 according to the present invention includes a data processor unit 12, a transmitter unit 14, a receiver unit 16, and a system controller 18. The data processor unit 12 includes a microprocessor unit 20 and a memory unit 22. The data processor unit 12 employs the microprocessor unit 20, in conjunction with the memory unit 22, to implement the technique of the present invention. That is, the microprocessor unit 20 processes the data from the receiver unit 16 in accordance with the processing technique discussed below. The memory unit 22 stores the program executed by the microprocessor unit 20 as well as the received, processed and extrapolated hydrophone data.

The sonar system 10 employs the system controller 18 as a user interface between the user and the various elements of the sonar system 10. The user controls all aspects of the system 10 through the system controller 18. The system controller 18 may include a display (not shown), an input device (keyboard and/or pointing device), and other control and/or interface mechanisms for the various elements of the system 10. The system controller 18 is electrically coupled to the data processing unit 12, transmitter unit 14 and receiver unit 16 through multi-wire bus 18a.

Figure 2:
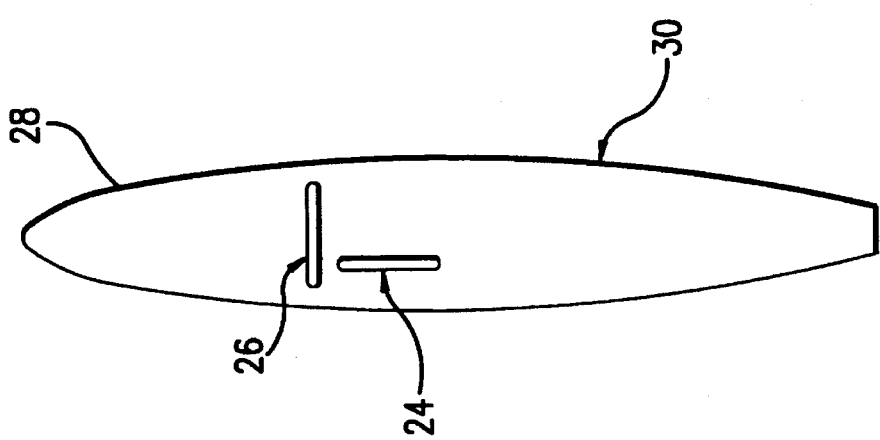
FIG. 2 is a plan view illustration of a typical location of the transmit and receiver arrays on the hull of the ship in a multibeam sonar system.

Briefly, the sonar system 10 employs the transmitter unit 14 to generate and transmit sound waves (energy) into the water. The transmitter unit 14 includes a transmitter array 24. The transmitter array 24 includes a plurality of individual transmitter elements (generators) for generating and transmitting energy. With reference to FIG. 2, the transmitter array 24 may be placed on the bottom of the hull 28 of ship 30. As illustrated, the transmitter array 24 may be aligned parallel to the longitudinal axis of the ship 30.

With reference to FIG. 1, the receiver unit 16 is employed to sense the return echo. The receiver unit 16 demodulates and processes the measured reflected energy so that the data processing unit 12 may perform further processing. The receiver unit 16 includes a receiver array 26. The receiver array 26 includes a plurality of hydrophones to sense and measure the properties of the reflected energy (return echo) including, for example, magnitude and phase. The receiver unit 16, including its sensing elements, is discussed in more detail below.

With reference to FIG. 2, the receiver array 26 may be mounted on the hull 28 in a lateral configuration relative to the longitudinal axis of the ship 30. The location of the receiver array 26 is somewhat determined by several guidelines, including: (1) placement of the receiver array 26 far enough to the center of the ship 30 to permit the use of a large array, and (2) placement of the receiver array 26 far enough forward to avoid excessive noise from the propulsion system (not shown) of the ship 30.

Figure 3A:
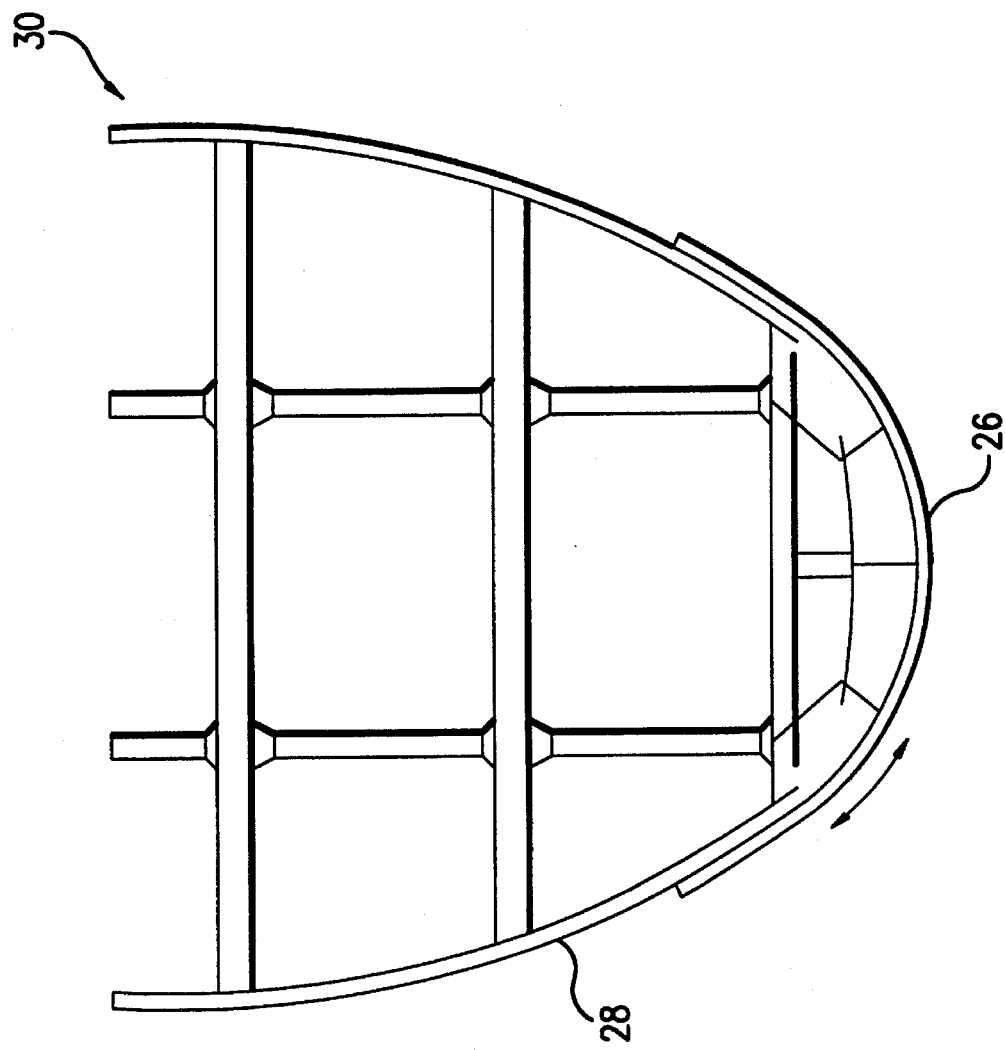
FIGS. 3A–3C are cross sectional views depicting various mounting configurations of the receiver array of a multibeam sonar system on the hull of a ship.

With reference to FIG. 3A, the receiver array 26 may be configured to conform to the exterior of the hull 28 of the ship 30. The receiver array 26 illustrated in FIG. 3A is "conformal" in the sense that the elements of the array are placed as close as possible to the hull 28 at all points, rather than along a simpler curve.

Figure 3B:
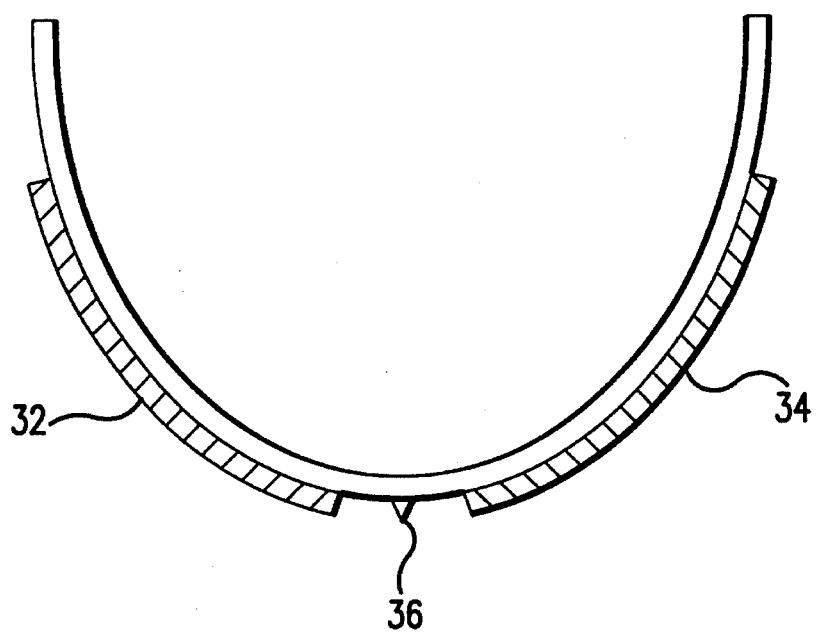

With reference to FIG. 3B, the receiver array 26 is depicted as conforming to the exterior of the hull 28 of the ship 30. However, the receiver array 26 is not a unitary element. Rather, the receiver array 26 consists of two sub-arrays 32 and 34. A receiver array 26 as depicted in FIG. 3B may be necessary so as to maintain the structural integrity of the keel 36 of the ship 30. Thus, in this situation, the receiver array 26 is not installed athwart ship as a single unit, as in FIG. 3A; instead, the receiver array 26 may be divided into two sub-arrays 32 and 34, each array conforming to the hull 28 of the ship 30.

Figure 3C:
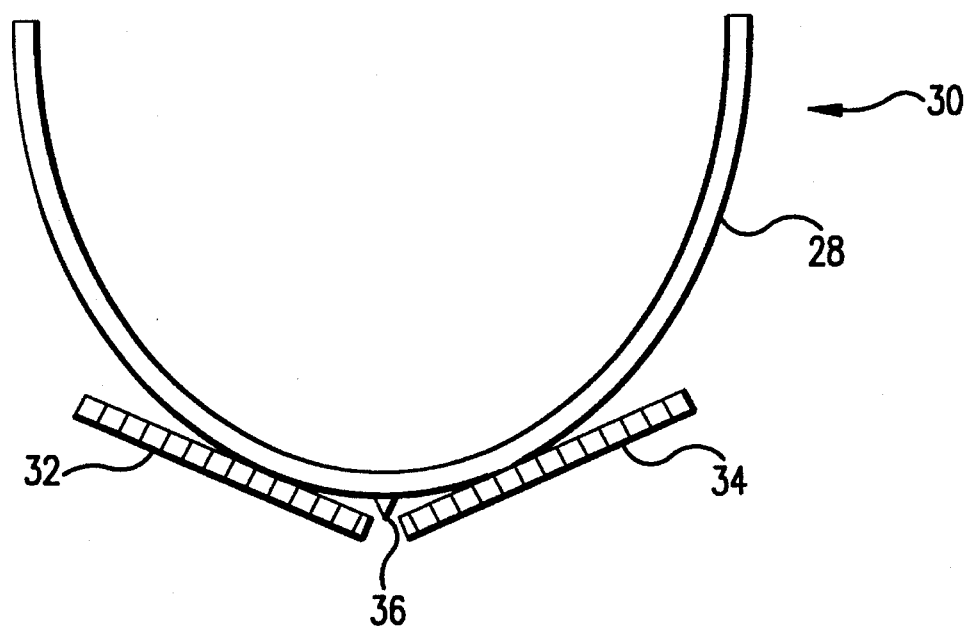

With reference to FIG. 3C, the receiver array 26 is mounted to the hull 28 of the ship 30 in a somewhat non-conformal manner. Furthermore, similar to the receiver array 26 illustrated in FIG. 3B, the receiver array 26 is not a unitary element, but consists of sub-arrays 32 and 34 which are separated by the keel 36 of the ship 30.

It should be noted that although FIGS. 3A–3C illustrate three mounting configurations of receiver array 26, it will be appreciated by one skilled in the art that other mounting configurations for receiver array 26 may be employed in practicing the present invention. For example, in FIGS. 3A and 3B, the receiver array 26 is illustrated as conforming to both the port and starboard sides of the ship 30. The receiver array 26, in some instances, need not be mounted on both sides of the ship 30; rather, the receiver array 26 may be placed (mounted) on either the port or starboard side of ship 30.

Figure 4A:
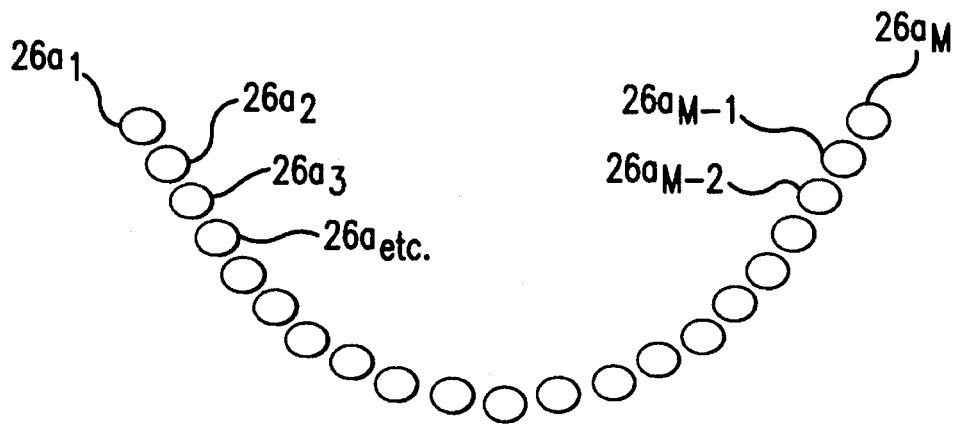
FIGS. 4A–4C are schematic block diagrams illustrating a portion of the plurality of hydrophones comprising the receiver arrays of FIGS. 3A–3C, respectively.
Figure 4B:
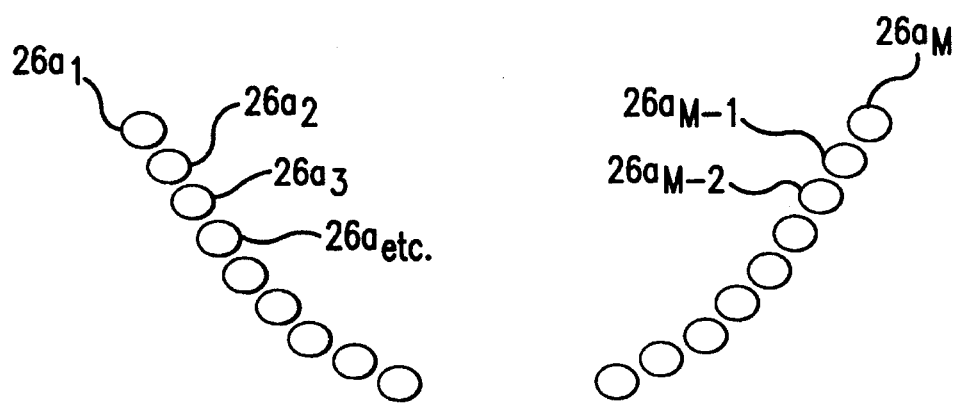
Figure 4C:
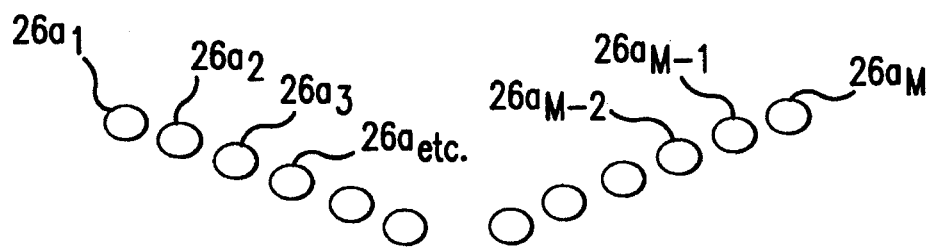

FIGS. 4A–4C are schematic block diagram illustrations of a portion receiver array 26. The receiver array 26 includes a plurality of physical hydrophones $26a_1$–$26a_M$. The physical hydrophones $26a_1$–$26a_M$ extend along the receiver array 26. The physical hydrophones $26a_1$–$26a_M$ measure the energy reflected by surrounding objects from the energy transmitted by the transmitter array 24.

Figure 5A:
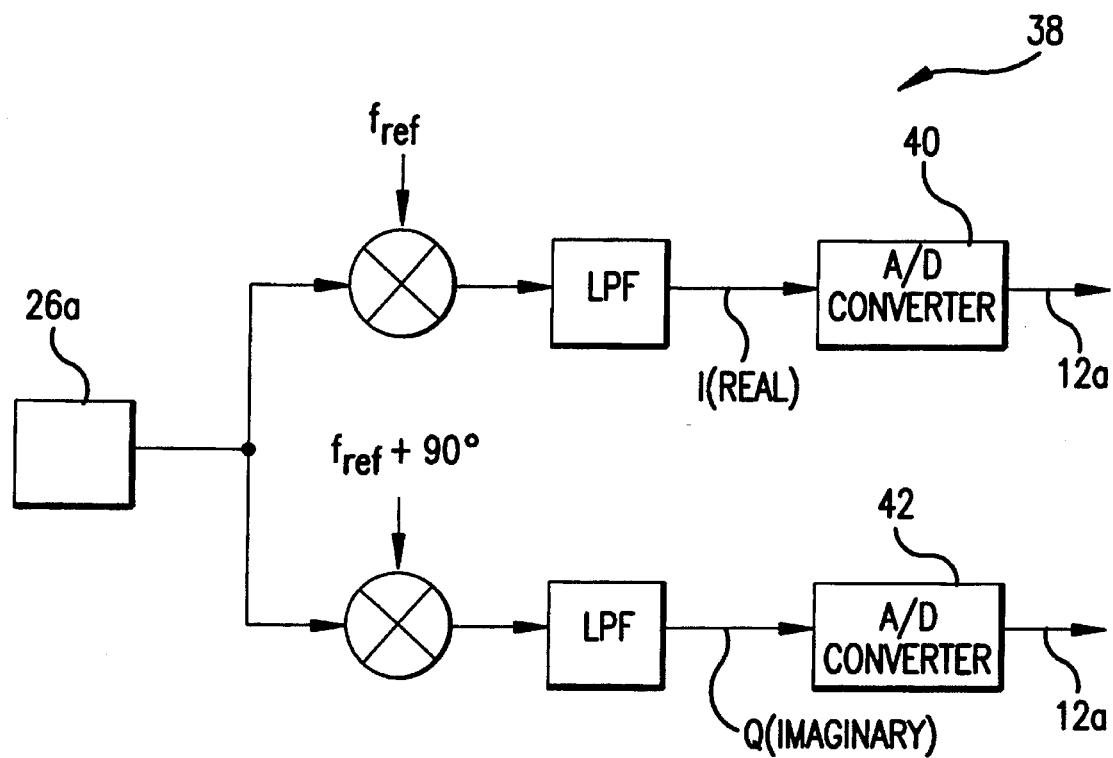
FIG. 5A is a schematic block diagram illustrating a physical hydrophone of the receiver array in conjunction with a superheterodyne type receiver and data sampling element.

With reference to FIG. 5A, the receiver unit 16 may also include superheterodyne receiver 38. The receiver 38 obtains the receive signals from the hydrophones 26a and generates an "in-phase" and "out-of-phase" signal from each receive signal of the hydrophones 26a. The "in-phase" (I) and "out-of-phase" (Q) signals are analog to digitally converted, via analog to digital converters 40 and 42. The digital representation of the I and Q signals are supplied to the data processor unit 12 for further processing according to the techniques of the present invention.

Figure 5B:
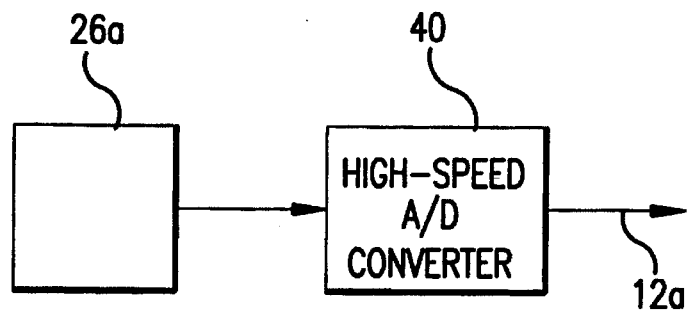
FIG. 5B is a schematic block diagram illustrating a physical hydrophone of the receiver array in conjunction with a data sampling element.

With reference to FIG. 5B, in some instances, the signals generated by the hydrophones 26a are not initially "processed" by a superheterodyne receiver. For instance, the signals from the hydrophones 26a may be sampled by a high-speed data sampling circuit 40 (e,g., a high-speed analog to digital converter and a sample and hold circuit) and the data processing unit 12 may "formulate" the related I and Q signal pairs. Thereafter, the data processing unit 12 processes the data in accordance with the techniques of the present invention.

Figure 6:
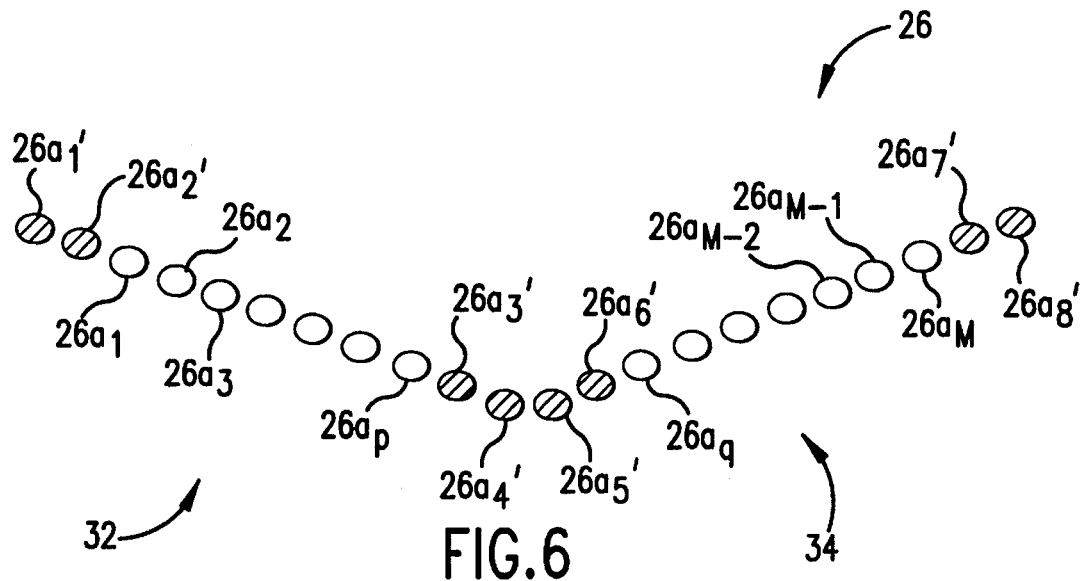
FIGS. 6–11 are each functional representations of a portion of a receiver array illustrating a plurality of physical hydrophones, extrapolated-hydrophones and/or faulty hydrophones of the receiver array of a multibeam sonar system.

As mentioned above, the present invention is a system and technique that extrapolates data from the data of the physical hydrophones 26a. With reference to FIG. 6, the physical hydrophones $26a_1$–$26a_M$ generate receive signals that are representative of the measured reflected energy. The data processing unit 12 computes the extrapolation data by extrapolating from the receive signals from hydrophones $26a_1$–$26a_M$. The computed extrapolated data is representative of receive signals from extrapolated hydrophones, for example, extrapolated "pseudo" hydrophones $26a_1'$–$26a_8'$. FIG. 6 illustrates the extrapolated hydrophones $26a_1'$–$26a_8'$ at positions (locations) on receiver array 26 corresponding to the computed extrapolated data.

With continued reference to FIG. 6, the present invention may be implemented to calculate extrapolated hydrophone data corresponding to extrapolated hydrophones $26a_1'$, $26a_2'$, $26a_7'$, and $26a_8'$. Under this circumstance, the physical hydrophones and the extrapolated hydrophones effectively increase the effective length of the receiver array 26 to attain a necessary or desired receive beam width.

Further, the present invention may be implemented to calculate extrapolated hydrophone data corresponding to extrapolated hydrophones $26a_3'$, $26a_4'$, $26a_5'$, and $26a_6'$. Under this circumstance, the physical hydrophones and the extrapolated hydrophones effectively provide a continuum of data points of the receiver array 26 when the receiver array 26 is not a unitary element. Here, the receiver array 26 consists of sub-arrays 32 and 34. As mentioned above, a receiver array 26 as depicted in FIG. 6 may be necessary so as to maintain the structural integrity of the keel 36 of the ship 30 (FIG. 3B).

It should be noted that the processing unit 12 may employ a portion of the physical hydrophones data to calculate an extrapolation value corresponding to an extrapolated-hydrophone, for example, $26a_3$. Under this circumstance, the processing unit 12 employs, for example, data from hydrophones $26a_3$–$26a_p$ in deriving extrapolation hydrophone data for hydrophone $26a_3'$.

Figure 7:
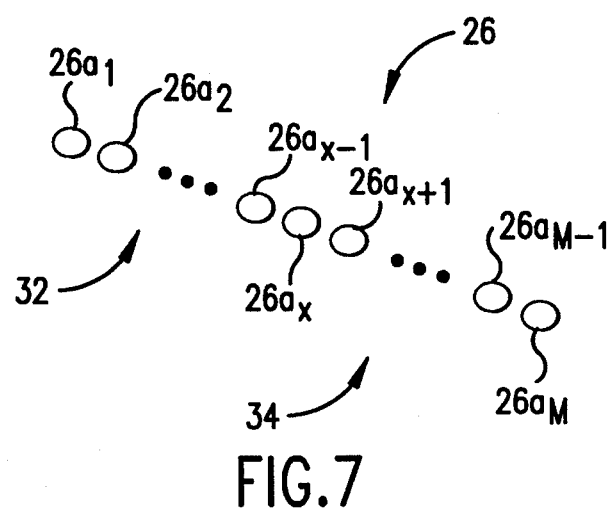

With reference to FIG. 7, the present invention may be implemented to extrapolate hydrophone data for erroneous or inaccurate data from an "inoperative" hydrophone, represented as hydrophone $26a_x$. The data from the inoperable hydrophone $26a_x$ is essentially "carved" out of the data generated by the receiver array 26 thereby leaving an absence of information for that position along the receiver array 26. The data processing unit 12 may extrapolate the physical hydrophone data of sub-array 32 (data from hydrophones $26a_1$–$26a_{x-1}$) along the array 26 to the "right". The calculated extrapolation value representing the hydrophone $26a_x$ may then be implemented in the further processing by the overall sonar system, e.g., combining all of the data to generate a calculated receive beam.

The data processing unit 12 may extrapolate the physical hydrophone data of sub-array 34 (data from hydrophones $26a_{x+1}$–$26a_M$) along the array to the "left". The data processing unit 12 may then implement the calculated extrapolation value representing the hydrophone $26a_x$ in the further processing of the sonar system 10.

Moreover, with continued reference to FIG. 7, the data processing unit 12 may interpolate a pseudo-hydrophone value corresponding to (or representing) the hydrophone $26a_x$ from the extrapolated values from the physical hydrophones of sub-arrays 32 and 34. In this regard, the data processor 12 may use weighted averages of each extrapolated value (the extrapolated value of sub-array 32 and the extrapolated value of sub-array 34). In short, the extrapolated values from the hydrophones of sub-arrays 32 and 34 are used to interpolate hydrophone data representative of data corresponding to the position of the inoperable hydrophone.

The weighted averages may be based on, or functions of, numerous criterion. In this regard, the final prediction of the pseudo-hydrophone value corresponding to or representing the hydrophone $26a_x$ (determined from the extrapolated values of subarrays 32 and 34) may take the form of:

$$Y_f^p = C_0 \times [C_1 y_1^0 = C_2 Y_r^p]$$

where:

yl$^p$=extrapolation value of the physical hydrophone data of sub-array 34 along the array to "left" (data from hydrophones $26a_1$–$26a_{x-1}$); and yr$^p$=extrapolation value of the physical hydrophone data of sub-array 32 along the array to "right" (data from hydrophones $26a_{x+1}$–$26a_M$).

Further, $C_0$, $C_1$, and $C_2$ are constants satisfying the following constraints:

$$0 \leq C_0 \times C_1 \leq 1$$

$$0 \leq C_0 \times C_2 \leq 1$$

$$C_0 \times [C_1 + C_2] = 1$$

The constants $C_1$ and $C_2$ may be functions of a number of parameters. As a result, the constants $C_1$ and $C_2$ may be expressed as:

$$C_1, C_2 = f(N, SNR, P, X)$$

where:
- N=the number of physical elements in the sub-array used in the prediction calculation;
- SNR=the Signal-to-Noise ratio in the Sub-array
- p=the order of the filter coefficient, and
- x=the distance of the extrapolated hydrophone from the nearest end of the sub-array.

Thus, as described above, the weighted averages may be based upon any number of variables; for example, the weighted averages may be based simply upon the number of hydrophones in each sub-array 32 and 34 that are used or contributing to the calculation of the predictor coefficients, N.

Thus, in effect, the receiver array is segmented into two sub-arrays, each containing a plurality of operable physical sensing elements. The "hole" created by the inoperable hydrophone $26a_x$ is "filled" by extrapolating from the operable hydrophone data from either sub-array 32, sub-array 34, or both.

It should be noted that the processing unit 12 may employ a portion of the hydrophones data to calculate an extrapolation value corresponding to inoperable hydrophone $26a_x$. Under this circumstance, the processing unit 12 employs, for example, data from hydrophones $26a_2$–$26a_{x-1}$ in deriving extrapolation hydrophone data for hydrophone $26a_x$.

In a preferred embodiment, the data processing unit 12 detects an inoperable hydrophone $26a_x$ in real time. Under this circumstance, the data processing unit 12 may continuously disregard signals from hydrophone $26a_x$ and, instead, continuously extrapolate and/or interpolate extrapolated-hydrophone data corresponding to hydrophone $26a_x$.

Figure 8:
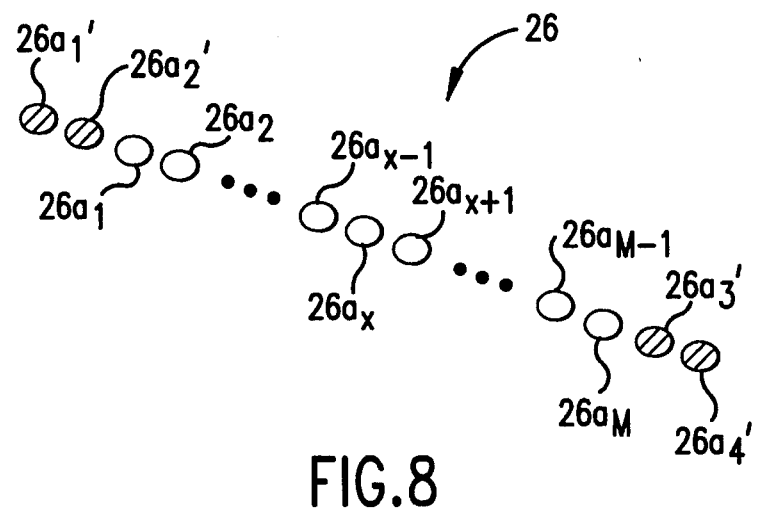

With reference to FIG. 8, the present invention may be implemented to extrapolate hydrophone data for both erroneous or inaccurate data from hydrophone $26a_x$, as well as to calculate extrapolated hydrophone data corresponding to extrapolated hydrophones $26a_1$, $26a_2'$. Under this circumstance, the physical hydrophones and the extrapolated hydrophones effectively increase the length of the receiver array 26 as well as generate hydrophone data for an "inoperative" hydrophone $26a_x$. As mentioned above, extrapolating the hydrophone data to the "left", may provide a greater effective length of the receiver array 26 in those situations where the length is constrained (i.e., where a desired or necessary physical dimension of the receiver array is not available to achieve the desired receive beam width).

In a preferred embodiment, the data processing unit 12 implements the following technique to generate the extrapolated data from the physical hydrophone data:

$$y_n = \sum_{k=1}^{N} d_k y_{n-k} \quad (1)$$

where:
- N=the order of the filter;
- $y_n$=the value of the extrapolated processing unit;
- $y_{n-k}$=the value of the extreme points of the physical and/or previously extrapolated processing unit in the direction of the extrapolation;
- $d_k$=the $N^{th}$ order predictor coefficients that predict the next value $Y_n$ of the spatial series from the previous N values $Y_{n-k}$, k=1 to N of the extreme physical and/or extrapolated processing units;
- M=the number of physical sensors in the physical array contributing to the calculation of the prediction coefficients $d_k$, k=1 to N, and N<M; and The extrapolation coefficients $d_k$ satisfy, and are obtained from, the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i Y_{i+k}; \text{ and}$$

$$k = 0, 1, 2, \ldots, N.$$

The values of $Y_k$ may be represented as related pairs of data processing units, including:

(1a) the real part of the hydrophone signal (I); and (1b) the imaginary part of the hydrophone signal (Q);

or:

(2a) the magnitude of the hydrophone signal, i.e., $\sqrt{I^2 + Q^2}$; and (2b) the phase of the hydrophone signal, i.e., $\tan^{-1}(Q/I)$.

Further, the values of $Y_k$ may also be represented as processing data unit of the total complex signal of I+jQ.

Figure 9:
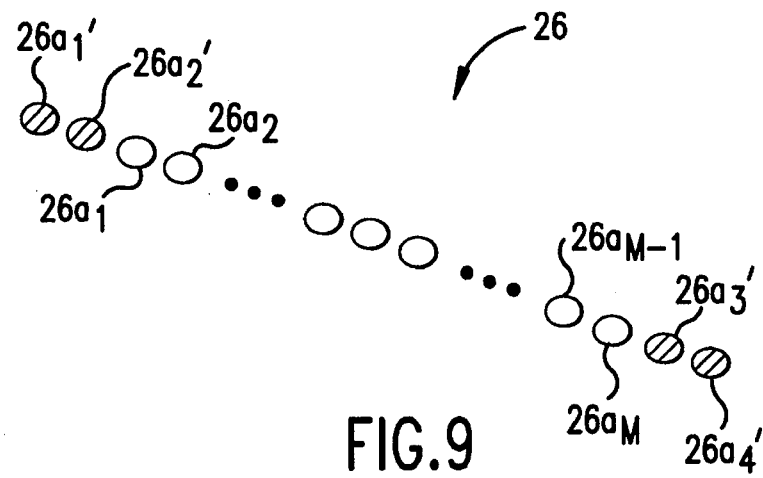

With reference to FIG. 9, as an overview, the hydrophones $26a_1$–$26a_M$ measure receive signals of the receiver array 26. Each receive signal from the hydrophones $26a_1$–$26a_M$ may be described as a related pair of data processing units, for example, a real and an imaginary portion. The data processing unit 12 computes a real portion of a receive signal of an extrapolated-hydrophone $26a_2'$ by extrapolation of the real portion of each receive signal of the physical hydrophones $26a_1$–$26a_M$. In addition, the data processing unit 12 computes an imaginary portion of the receive signal of the extrapolated-hydrophone $26a_2'$ by extrapolation of the imaginary portion of each receive signal of the receiver array 26. The data processing unit 12 then combines the real and imaginary portion of the receive signal of the extrapolated-hydrophone $26a_2'$ to the real and imaginary portion of each receive signal of the physical hydrophones $26a_1$–$26a_M$. Under this circumstance, the sonar system experiences an increase in the "effective" length of the receiver array which narrows the effective beam width of a calculated receive beam.

In application, if the array 26 includes "M" elements (hydrophones), the first extrapolated sample $y_{M+1}$ (corresponding to data of extrapolated hydrophone $26a_2'$) is given by EQUATION 1, using the extreme N data samples of the physical spatial series. Similarly, the next extrapolated sample $Y_{M+2}$ (corresponding to data of extrapolated hydrophone $26a_1'$) is obtained by including the first extrapolated value ($Y_{M+1}$) in EQUATION 1. This process may be continued until a desired or necessary number of elements have been estimated (data of extrapolated-hydrophone $26a_3'$ and $26a_4'$).

It should be noted that the techniques of the present invention do not require that data from all of the physical elements of the receiver array 26 be employed in computing the extrapolation data. That is, the technique requires that only a portion of the data from the physical hydrophones ($26a_1$–$26a_M$) of the receiver array 26 be employed in computing extrapolation data (which corresponds to extrapolated-hydrophones $26a_1$, $26a_2'$, $26a_3'$ and $26a_4'$).

The predictor coefficients $d_1, d_2, ..., d_N$ in EQUATION 1, may be derived by observing (see, e.g., Swingler et al., "Line-Array Beamforming Using Linear Prediction for Aperture Interpolation and Extrapolation", IEEE Trans. Acoust., Speech, Signal Processing 33, 1, (1989)) that the transfer function, H(z), of the "extrapolation filter" described by EQUATION 1 may be expressed as:

$$H(z) = \frac{1}{1 - \sum_{k=1}^{N} d_k z^{-k}}$$

If "z" is replaced by $e^{jw}$, then $|H(e^{jw})|^2$ is a form of Maximum Entropy or Autoregressive Spectral Estimate from the given data. As a result, the extrapolation coefficients satisfy:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i Y_{i+k}; \text{ and}$$

$k = 0, 1, 2, \ldots, N$.

Andersen, in "On the Calculation of Filter Coefficients for Maximum Entropy Spectral Analysis," Geophysics 39, 1 (1974), presented a method for estimating the Maximum Entropy spectral coefficients from a set of equispaced data points. It is noted that Andersen presents a somewhat fast and simple method for inverting the above matrix equation.

It should be noted further that the stability of the coefficients derived by the Andersen method may be important. Specifically, since the linear predictor coefficients satisfy the characteristic polynomial $$z^N - \sum_{k=1}^{N} d_k z^{N-k} = 0 \quad (3)$$

the condition is that the roots of EQUATION 3 should be within the unit circle for stability; that is, the roots of EQUATION 3, $Z_i$, should satisfy the criterion of:

$|z_i| \leq 1$

For roots that fall outside the unit circle, the roots should be "brought" within the unit circle with the transformation:

$$z_i \rightarrow \frac{z_i}{|z_i|}$$

and the coefficients are re-computed to satisfy the characteristic polynomial given by EQUATION 3. One advantage for employing such a transformation is that since the length of receiver array 26 is much smaller than the attenuation length of the signal in water, it may be expected that the physical hydrophone signals from array 26 are the sum of undamped sine and cosine waves.

Since the real and the imaginary hydrophone data are samples of the same wave form differing only by 90°, this method may be applied separately to the real and imaginary hydrophone data.

Figure 10:
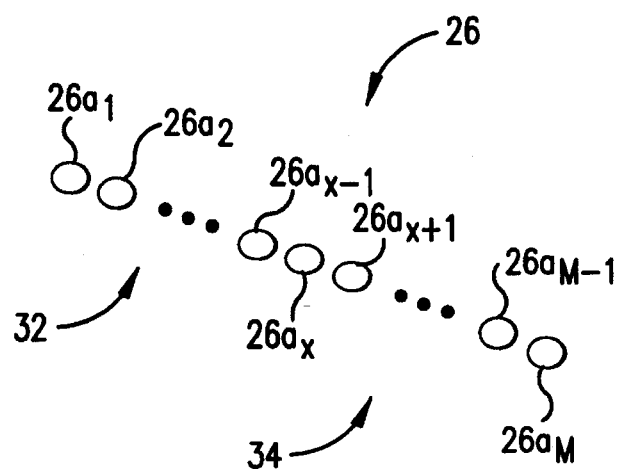

As mentioned above, the technique of the present invention may also be employed to effectively interpolate hydrophone data representative of hydrophones positioned between sub-arrays 32 and 34. This may result from a faulty or inoperative physical hydrophone located within the receiver array 26. With reference to FIG. 10, the faulty or inoperative hydrophone is represented by physical hydrophone $26a_x$, the sub-array 32 includes physical hydrophones $26a_1$ through physical hydrophone $26a_{x-1}$, and the sub-array 34 includes physical hydrophones $26a_{x+1}$ through physical hydrophone $26a_M$.

Under these circumstances, the data processing unit 12 calculates the coefficients, $d_k$ (k=1 to N), for the physical hydrophones $26a_1$ through $26a_{x-1}$ of sub-array 32 using EQUATION 2. The coefficients are then employed with physical hydrophone values $y_1$ to $Y_{x-1}$ to calculate the extrapolated value $Y_{x|sub-array\ 32} y_{x|sub-array\ 32}$ is representative of extrapolated-hydrophone $26a_x$ computed from the data of the physical hydrophones $26a_1$–$26a_{x-1}$ of sub-array 32.

The data processing unit 12 may also calculate the coefficients, $d_k$ (k=1 to N), for the physical hydrophones $26a_{x+1}$ through $26a_M$ of sub-array 34 using EQUATION 2. The coefficients are then employed with physical hydrophone values $y_{x+1}$ to $y_M$ to calculate the extrapolated value $y_{x|sub-array\ 34}$. $y_{x|subarray\ 34}$ is representative of extrapolated-hydrophone $26a_x$ computed from the data of the physical hydrophones $26a_{x+1}$–$26a_M$ of the sub-array 34.

These two extrapolated-values ($Y_{x|sub-array\ 32}$ and $y_{x|sub-array\ 34}$) of extrapolated-hydrophone $26a_x$ may then be averaged using the criterion discussed above regarding weighting. For example, two extrapolated-values of extrapolated-hydrophone $26a_x$ may be averaged using the number of coefficients in each array 32 and 34 as weights to determine an "effective" interpolated value at the location in the receiver array 26 corresponding to hydrophone $26a_x$.

It should be noted that the value of the inoperative or faulty hydrophone $26a_x$ may be considered "zero" and the coefficients, $d_k$ (k=1 to N), will be derived using all the values from physical hydrophone $26a_1$ through $26a_M$. The valid set of coefficients, $d_k$ (k=1 to N), may then be applied, in conjunction with physical hydrophones $26a_1$ through $26a_{x-1}$, to predict or extrapolate the value corresponding to hydrophone $26a_x$. The valid set of coefficients, $d_k$ (k=1 to N), may also be applied, in conjunction with physical hydrophones $26a_{x+1}$ through $26a_M$, to predict or extrapolate the value corresponding to hydrophone $26a_x$. The data processing unit 12 may then average these two extrapolated values to find the final interpolated value corresponding to hydrophone $26a_x$ using the criterion regarding weighting as discussed above.

Figure 11:
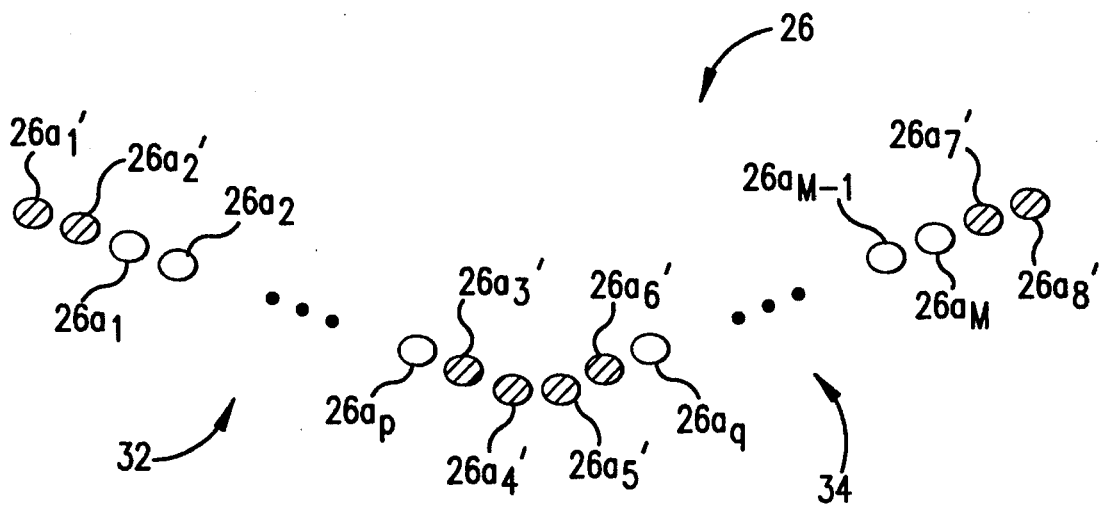

With reference to FIG. 11, the present invention may be implemented to calculate extrapolated hydrophone data corresponding to extrapolated hydrophones $26a_3'$, $26a_4'$, $26a_5'$, and $26a \neq '$. As mentioned above, under this circumstance, the physical hydrophones and the extrapolated hydrophones effectively provide a continuum of data points of the receiver array 26 when the receiver array 26 is not a unitary element.

The data processing unit 12 calculates the coefficients, $d_k$ (k=1 to N), for the physical hydrophones $26a_1$ through $26a_p$ of sub-array 32 using EQUATION 2. The coefficients are then employed with physical hydrophone values $y_1$ to $y_p$ to calculate the extrapolated value $Y_{a3}'$. The extrapolated value Y$a_3'$ is representative of the data corresponding to extrapolated-hydrophone $26a_3$'.

The data processing unit 12 then uses these $d_k$ coefficients and the physical hydrophone values $Y_2$ to $y_p$ and extrapolated-hydrophone $Y_{a3'}$ to calculate the extrapolated value $Y_{a4'}$. The value $y_{a4'}$ is data representative of extrapolated-hydrophone $26a_4$' from sub-array 32.

The data processing unit 12 may also calculate the coefficients, $d_k$ (k=1 to N), for the physical hydrophones $26a_q$ through $26a_M$ of sub-array 34 using EQUATION 2. The coefficients are then employed with physical hydrophone values $y_q$ to $y_M$ to calculate the extrapolated value $Y_{a6'}$. The extrapolated value $y_{a6'}$ is representative of the data corresponding to extrapolated-hydrophone $26a_6$'.

The data processing unit 12 then uses these $d_k$ coefficients and the physical hydrophone values $y_q$ to $y_{m-1}$ and extrapolated-hydrophone $Y_{a6'}$ to calculate the extrapolated value $Y_{a5'}$. The value $Y_{a5'}$ is data representative of extrapolated-hydrophone $26a_5$'.

It should be noted that in those situations where the data processing unit 12 calculates an extrapolated hydrophone value which "overlaps" the sub-arrays 32 and 34, then the two values representative of an extrapolated-hydrophone may be averaged using appropriate weighting, as discussed above, (for example, the number of coefficients in each array 32 and 34) to determine an "effective" interpolated value at the location in the receiver array 26 corresponding to the extrapolated-hydrophone.

With continued reference to FIG. 11, the coefficients, $d_k$ (k=1 to N), for the physical hydrophones, as well as the extrapolated data, may be used to calculate extrapolation data representative of extrapolated-hydrophones $26a_1$' and $26a_2$', and $26a_7$' and $26a_8$' at the distal ends of sub-arrays 32 and 34.

Various preferred embodiments of the present invention have been described. It is understood, however, that changes and modifications may be made without departing from the true scope and spirit of the present invention as defined by the following claims. For example, it should be noted that the present invention may be implemented and practiced in numerous permutations and situations for generating extrapolated-hydrophone data (of which only a portion have been described).

Moreover, it should be noted that the present invention may be implemented and practiced in connection with numerous sensing systems, including sonar, radar, and lidar. For example, a radar system, as with sonar, may be used to detect, navigate, track, classify and locate objects. Radar is a method of scanning the surrounding space by means of high-frequency radio waves which are sent out from a powerful transmitter and are reflected by many objects which they encounter. The reflected signal is picked up by a receiver. The characteristics of the reflected signal, for example, its strength and direction, provides information regarding the characteristics of the object, for example, distance, or altitude of the object.

Figure 12:
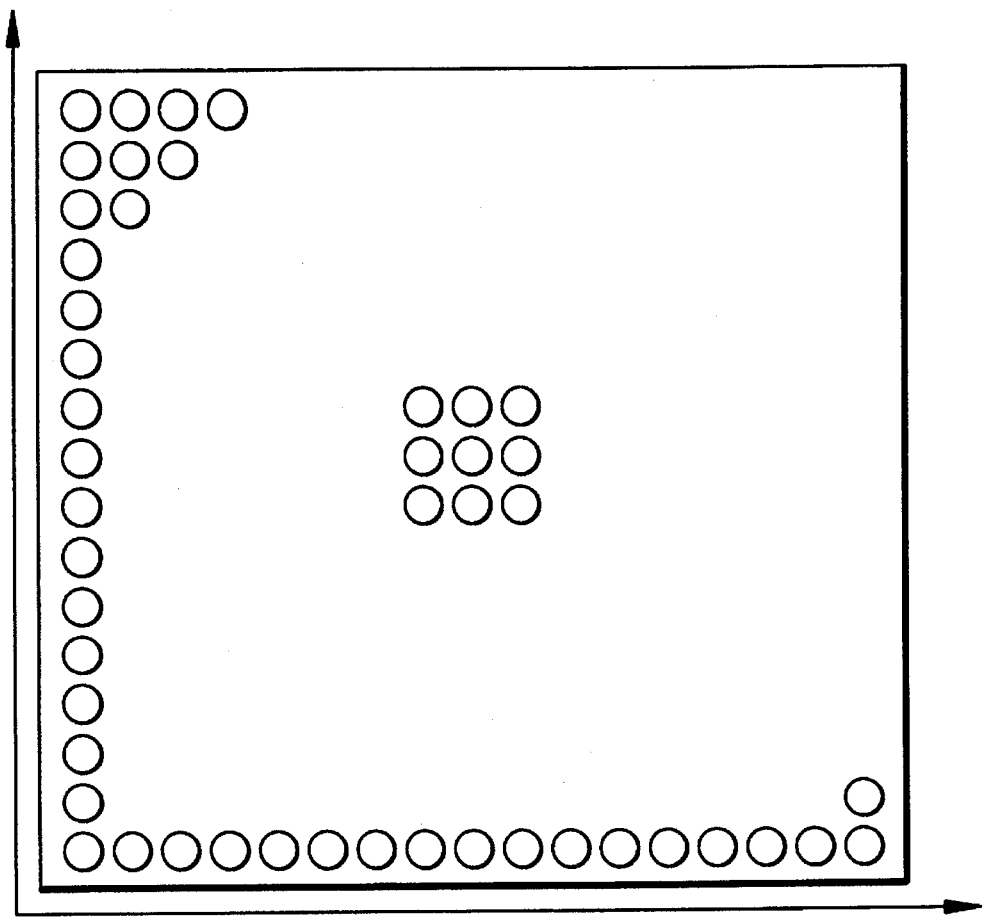
FIG. 12 is a functional illustration of the elements of a phased array antenna of a phased array radar system.

Radar systems that may employ the present invention are those types typically classified as phased array. A functional illustration of the elements of the phased array is depicted in FIG. 12.

Moreover, the present invention may be implemented and practiced using numerous types of transmitter and receiver configurations including those disclosed in Lustig et al., U.S. Pat. No. 3,114,631. Many variations, modifications and improvements of the transmitter and receiver configurations (including the transmitter arrays and receiver arrays) disclosed in U.S. Pat. No. 3,114,631 are also suitable.

What is claimed is:

1. A method of reducing the effective beam width of a receive beam for a sensing system having a physical array of sensors, comprising:

measuring a receive signal for each sensor of the array of sensors, wherein each receive signal of each sensor includes a related pair of data processing units, including a first data processing unit and a second data processing unit;

computing a first data processing unit of a receive signal of at least one extrapolated-sensor by extrapolation of the first data processing unit of each receive signal of the physical sensors of the sensor array;

computing a second data processing unit of the receive signal of the at least one extrapolated-sensor by extrapolation of the second data processing unit of each receive signal of the physical sensors of the sensor array;

combining the first and second data processing units of the receive signal of the at least one extrapolated-sensor to the first and second data processing units of each receive signal of the physical sensors to narrow the effective beam width of a calculated receive beam.

2. The method of claim 1 further including computing a first and a second data processing unit of each receive signal of each sensor of the array of sensors.

3. The method of claim 1 further including:

computing a first data processing unit of a second extrapolated-sensor by extrapolation of the first data processing unit of the first extrapolated-sensor and at least a portion of the first data processing units of the physical sensors of the array; and computing a second data processing unit of the second extrapolated-sensor by extrapolation of the second data processing unit of the first extrapolated-sensor and at least a portion of the second data processing units of the physical sensors of the array.

4. The method of claim 3 further including:

combining the first data processing unit of the second extrapolated-sensor with the first data processing unit of the first extrapolated-sensor and the first data processing units of the physical sensors of the array; and combining the second data processing unit of the second extrapolated-sensor with the second data processing unit of the first extrapolated-sensor and the second data processing units of the physical sensors of the array to narrow the effective beam width of a calculated receive beam.

5. The method of claim 1 wherein said sensing system is implemented in a multibeam bathymetric, imaging or stereoscopic sonar system.

6. The method of claim 1 wherein said extrapolation includes using a prediction equation of:

$$y_n = \sum_{k=1}^{N} d_k y_{n-k}$$

where:

N=the order of the filter;

$Y_n$=the value of the extrapolated processing unit;

$y_{n-k}$=the value of the extreme points of the physical and/or previously extrapolated processing unit in the direction of the extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$$k = 0, 1, 2, \ldots, N.$$

7. A method of generating extrapolated-sensor data in a sensing system having a physical array of sensors, said array of sensors includes a sub-array of sensors wherein the sub-array includes a plurality of sensors, said method comprising:

measuring a receive signal for each sensor of the sub-array of sensors, wherein each receive signal of each sensor of the sub-array of sensors includes a first and second data processing unit;

computing a first extrapolated-sensor data unit of a first extrapolated-sensor by extrapolation of the first data processing units of the sensors of the sub-array; and computing the second extrapolated-sensor data unit of the first extrapolated-sensor by extrapolation of the second data processing unit of the sub-array.

8. The method of claim 7 wherein the data extrapolation includes using a prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of the extrapolation;

$d_k$=the $N^{th}$ order predictor coefficients that predict the next value $y_n$ of the spatial series from the previous N values $Y_{n-k}$, k=1 to N of the extreme physical and/or extrapolated processing units;

M=the number of physical sensors in the physical sub-array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

-continued
where:

$$\phi_k = \frac{1}{M-k} \sum_{i=1}^{M-k} y_i y_{i+k}; \text{ and}$$

$$k = 0, 1, 2, \ldots, N.$$

9. The method of claim 7 further including:

detecting inaccurate sensor data of a physical sensor positioned at a distal end of the sub-array; and substituting the computed first and second extrapolated-sensor data units of said first extrapolated-sensor for the inaccurate sensor data.

10. The method of claim 9 further including:

computing a first extrapolated-sensor data unit of a second extrapolated-sensor by extrapolation of the first extrapolated-sensor data unit of the first extrapolated-sensor and the first data processing units of at least a portion of the physical sensors of the sub-array; and computing a second extrapolated-sensor data unit of a second extrapolated-sensor by extrapolation of the second extrapolated-sensor data unit of the first extrapolated-sensor and the second data processing units of at least a portion of the physical sensors of the sub-array.

11. The method of claim 10 wherein said sensing system is implemented in a multibeam bathymetric, imaging or stereoscopic sonar system.

12. A method of generating extrapolated-sensor data units in a sensing system having an array of sensors, said array of sensors includes a first sub-array of physical sensors and a second sub-array of physical sensors wherein each sub-array includes a plurality of mutually exclusive sensors, said method comprising:

measuring a receive signal for each sensor of the first physical sub-array of sensors, wherein each receive signal of each sensor of the first physical sub-array of sensors includes a related pair of data processing units including a first and a second data processing unit;

measuring a receive signal for each sensor of the second physical sub-array of sensors, wherein each receive signal of each sensor of the second physical sub-array of sensors includes a related pair of data processing units, including a first and a second data processing unit;

computing a first extrapolated-sensor data unit of a first extrapolated-sensor for the first sub-array by extrapolation of at least a portion of the first data processing units of the first sub-array of physical sensors;

computing second extrapolated-sensor data unit of the first extrapolated-sensor for the first sub-array by extrapolation of at least a portion of the second data processing units of the first sub-array of physical sensors;

computing a first extrapolated-sensor data unit of a second extrapolated-sensor for the second sub-array by extrapolation of at least a portion of the first data processing units of the second sub-array of physical sensors; and computing second extrapolated-sensor data unit of the second extrapolated-sensor for the second sub-array by extrapolation of at least a portion of the second data processing units of the second sub-array of physical sensors.

13. The method of claim 12 further including computing first and second interpolated-sensor data units of an interpolated-sensor by using a weighted average of the first and second data processing units of the first extrapolated-sensor and a weighted average of the first and second data processing units of the second extrapolated-sensor, wherein the first and second sub-arrays are arranged along two segments of a common line and the data from the first and the second extrapolated-sensor is representative of sensor data that would be sensed by a physical sensor at the same location, and wherein the interpolated-sensor, first sub-array, and second sub-array form a continuous line of sensors.

14. The method of claim 13 further including:

detecting inaccurate sensor data from a sensor in the array of sensors physically positioned between the first and second physical sensor sub-arrays; and substituting a weighted average of the computed first and second extrapolated-sensor data units of the first and second extrapolated-sensors for the inaccurate sensor data.

15. The method of claim 12 further including:

computing a first extrapolated-sensor data unit of a third extrapolated-sensor using the first data processing units of a first composite-sensor sub-array which includes at least the first extrapolated-sensor data units of the first extrapolated-sensor and at least a portion of first data processing units of the first sub-array of physical sensors;

computing a second extrapolated-sensor data unit of the third extrapolated-sensor using the second data processing units of a first composite-sensor sub-array which includes at least the second extrapolated-sensor data unit of the first extrapolated-sensor and at least a portion of second data processing units of the first sub-array of physical sensors;

computing a first extrapolated-sensor data unit of a fourth extrapolated-sensor using the first data processing units of a second composite-sensor sub-array which includes at least the first extrapolated-sensor data unit of the second extrapolated-sensor and at least a portion of first data processing units of the second sub-array of physical sensors; and computing a second extrapolated-sensor data unit of a fourth extrapolated-sensor using the second data processing units of a second composite-sensor sub-array which includes at least the second extrapolated-sensor data unit of the second extrapolated-sensor and at least a portion of the second data processing units of the second sub-array of physical sensors.

16. The method of claim 15 further including computing first and second interpolated-sensor data units of an interpolated-sensor by using a weighted average of the first data processing units of the third and fourth extrapolated-sensors and a weighted average of the second data processing units of the third and fourth extrapolated-sensors, wherein the first and second composite sub-arrays are arranged along two segments of a common line and the data from the third and the fourth extrapolated-sensors are representative of sensor data that would be sensed by a physical sensor at the same location, and wherein the interpolated-sensor, first composite sub-array, and second composite sub-array form a continuous line of sensors.

17. The method of claim 15 wherein the first and second sub-arrays are arranged in a sloped configuration, and the third extrapolated-sensor is representative of sensor data at the converging end of the first physical sub-array, and the fourth extrapolated-sensor is representative of sensor data at the converging end of the second physical sub-array such that the data of the first and second composite sub-arrays data provide a separation, at the converging ends, of an amount equal to the spacing of a physical sensor, and wherein the third and fourth extrapolated-sensor data units are representative of sensor data corresponding to a sensor positioned between the first and second physical sub-arrays.

18. The method of claim 12 wherein said extrapolation includes using a prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of the extrapolation;

$d_k$=the $N^{th}$ order predictor coefficients that predict the next value $y_n$ of the spatial series from the previous N values $Y_{n-k}$, k=1 to N of the extreme physical and/or extrapolated processing units;

M=the number of physical sensors in the physical sub-array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$$k = 0, 1, 2, \ldots, N.$$

19. The method of claim 12 wherein said sensing system is implemented in a multibeam bathymetric, imaging or stereoscopic sonar system.

20. A sensing system comprising:

a plurality of physical sensors each for measuring a receive signal wherein each receive signal includes a first and a second data processing unit;

means for computing sensor data for at least one extrapolated-sensor, said means including, first extrapolation means for computing a first extrapolated-sensor data unit of the at least one extrapolated-sensor by extrapolation of a first data processing unit of the plurality of physical sensors, and second extrapolation means for computing a second extrapolated-sensor data unit of the at least one extrapolated-sensor by extrapolation of a second data processing unit of the plurality of physical sensors; and means for combining the first and second extrapolated-sensor data units of the at least one extrapolated-sensor to the first and second data processing units of the plurality of physical sensors to thereby generate a narrower effective beam width of a receive beam.

21. The system of claim 20 further including means for computing first and second data units from each receive signal of the physical sensors of the array.

22. The method of claim 20 wherein said extrapolation includes using a prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$k = 0, 1, 2, \ldots, N$.

23. The system of claim 20 wherein said sensing system is implemented in a multibeam bathymetric, imaging or stereoscopic sonar system.

24. A system for generating a related pair of extrapolated-sensor data units in a sensing system having an array of physical sensors, said array of physical sensors includes a first sub-array of physical sensors and a second sub-array of physical sensors wherein each sub-array includes a plurality of mutually exclusive physical sensors, and wherein each physical sensor of the sub-arrays of physical sensors provides a receive signal including first and second data processing units, said system comprising:

means for computing a first extrapolated-sensor data unit of a first extrapolated-sensor by extrapolation of at least a portion of the first data processing units of the physical sensors of the first sub-array of physical sensors;

means for computing a second extrapolated-sensor data unit of the first extrapolated-sensor by extrapolation of at least a portion of the second data processing units of the first sub-array of physical sensors;

means for computing a first extrapolated-sensor data unit of a second extrapolated-sensor by extrapolation of at least a portion of the first data processing units of the second sub-array of physical sensors; and means for computing a second extrapolated-sensor data unit of the second extrapolated-sensor by extrapolation of at least a portion of the second data processing units of the second sub-array of physical sensors.

25. The system of claim 24 further including means for computing first and second interpolated-sensor data units of an interpolated-sensor by using a weighted average of the first data processing units of the first and second extrapolated-sensors and a weighted average of the second data processing units of the first and second extrapolated-sensors, wherein the first and second sub-arrays are arranged along two segments of a common line and the data from the first and the second extrapolated-sensors are representative of sensor data that would be sensed by a physical sensor at the same location, and wherein the interpolated-sensor, first sub-array, and second sub-array form a continuous line of sensors.

26. The system of claim 24 further including means for detecting inaccurate sensor data from a sensor in the array of sensors physically positioned between the first and second physical sensor sub-arrays and for substituting a weighted average of the computed first and second extrapolated-sensor data units of the first and second extrapolated-sensors for the inaccurate sensor data.

27. The system of claim 24 further including:

means for computing a first extrapolated-sensor data unit of a third extrapolated-sensor using first data processing units of a first composite-sensor sub-array which includes at least the first extrapolated-sensor data units of the first extrapolated-sensor and at least a portion of the first data processing units of the first sub-array of physical sensors;

means for computing a second extrapolated-sensor data unit of a third extrapolated-sensor using second data processing units of a first composite-sensor sub-array which includes at least the second extrapolated-sensor data unit of the first extrapolated-sensor and at least a portion of second data processing units of the first sub-array of physical sensors;

means for computing a first extrapolated-sensor data unit of a fourth extrapolated-sensor using first data processing units of a second composite-sensor sub-array which includes at least the first extrapolated-sensor data unit of the second extrapolated-sensor sensor and at least a portion of first data processing units of the second sub-array of physical sensors; and means for computing a second extrapolated-sensor data unit of a fourth extrapolated-sensor using second data processing units of a second composite-sensor sub-array which includes at least the second extrapolated-sensor data units of the second extrapolated-sensor and at least a portion of second data processing units of the second sub-array of physical sensors.

28. The system of claim 27 wherein the first and second sub-arrays are arranged in a sloped configuration, and the third extrapolated-sensor is representative of sensor data at the converging end of the first physical sub-array, and the fourth extrapolated-sensor is representative of sensor data at the converging end of the second physical sub-array such that the data of the first and second composite sub-arrays data provide a separation, at the converging ends, of an amount equal to the spacing of a physical sensor, and wherein the first and second extrapolated-sensor data units are representative of sensor data corresponding to sensors positioned between the first and second physical sub-arrays.

29. The system of claim 27 further including means for computing first and second interpolated-sensor data units of an interpolated-sensor by using a weighted average of the first data processing units of the third and fourth extrapolated-sensors and a weighted average of the second data processing units of the third and fourth extrapolated-sensors, wherein the first and second composite sub-arrays are arranged along two segments of a common line and the data from the third and the fourth extrapolated-sensors are representative of sensor data that would be sensed by a physical sensor at the same location, and wherein the interpolated-sensor, first composite sub-array, and second composite sub-array form a continuous line of sensors.

30. The system of claim 24 wherein the data extrapolation includes using a prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical sub-array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$k = 0, 1, 2, \ldots, N$.

31. A sensing system for computing extrapolated-sensor data units for a sensing system having an array of physical sensors, said array of physical sensors includes a sub-array of physical-sensors wherein the sub-array includes a plurality of physical sensors, and wherein each physical sensor of the sub-array provides a receive signal including first and second data processing units, said system comprising:

extrapolation computing means for computing the extrapolated-sensor data, said computing means including, first computing means for computing a first extrapolated-sensor data unit of a first extrapolated-sensor by extrapolation of the first data processing unit of the sensors of the sub-array of physical sensors, and second computing means for computing a second extrapolated-sensor data unit of the first extrapolated-sensor by extrapolation of the second data processing unit of the sub-array of physical sensors.

32. The system of claim 31 wherein the extrapolation computing means computes the first and second extrapolated-sensor data units using a prediction equation of:

$$y_n = \sum_{k=1}^{N} d_k y_{n-k}$$

where:

N=the order of the filter;

$Y_n$=the value of the extrapolated processing unit;

$y_{n-k}$=the value of the extreme points of the physical and/or previously extrapolated processing unit in the direction of extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical sub-array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$k = 0, 1, 2, \ldots, N$.

33. The system of claim 31 further including means for detecting inaccurate sensor data from a physical sensor positioned at a distal end of the physical sensor sub-array and for substituting the computed first and second extrapolated-sensor data units of said first extrapolated-sensor for the inaccurate sensor data.

34. The system of claim 33 wherein the extrapolation computing means further includes:

means for computing a first extrapolated-sensor data unit of a second extrapolated-sensor by extrapolation of the first extrapolated-sensor data unit of the first extrapolated-sensor and the first data processing units of at least a portion of the sensors of the sub-array of physical sensors, and for computing a second extrapolated-sensor data unit of the second extrapolated-sensor by extrapolation of the second extrapolated-sensor data unit of the first extrapolated-sensor and at least a portion of the second data processing units of the sub-array of physical sensors.

35. The system of claim 32 wherein said sensing system is implemented in a multibeam bathymetric, imaging or stereoscopic sonar system.

36. A system for generating extrapolated-sensor data in a sensing system having a physical array of sensors, said array of sensors includes a sub-array of sensors wherein the sub-array includes a plurality of sensors, said system comprising:

means for measuring a receive signal for each sensor of the sub-array of sensors, wherein each receive signal of each sensor of the sub-array of sensors includes a first and second data processing unit;

first extrapolation computing means for computing a first extrapolated-sensor data unit of a first extrapolated-sensor by extrapolation of the first data processing units of the sensors of the sub-array; and second extrapolation computing means for computing the second extrapolated-sensor data unit of the first extrapolated-sensor by extrapolation of the second data processing unit of the sub-array.

37. The system of claim 36 wherein the first and second extrapolation computing means computes the first and second extrapolated-sensor data units using a prediction equation of:

$$y_n = \sum_{k=1}^{N} d_k y_{n-k}$$

where:

N=the order of the filter;

$y_n$=the value of the extrapolated processing unit;

$y_{n-k}$=the value of the extreme points of the physical and/or previously extrapolated processing unit in the direction of extrapolation;

$d_k$=the $N^{th}$ order predictor coefficients that predict the next value $y_n$ of the spatial series from the previous N values $y_{n-k}$, k=1 to N of the extreme physical and/or extrapolated processing units;

M=the number of physical sensors in the physical sub-array contributing to the calculation of the prediction coefficients $d_k$, k=1 to N, and N<M; and wherein the filter coefficients $d_k$ are obtained from the relationship:

$$\begin{bmatrix} \phi_0 & \phi_1 & \phi_2 & \cdots & \phi_N \\ \phi_1 & \phi_0 & \phi_1 & \cdots & \phi_{N-1} \\ \phi_2 & \phi_1 & \phi_0 & \cdots & \phi_{N-2} \\ \cdots & & & & \cdots \\ \phi_N & \phi_{N-1} & \phi_{N-2} & \cdots & \phi_0 \end{bmatrix} \times \begin{bmatrix} 1 \\ d_1 \\ d_2 \\ \cdots \\ d_N \end{bmatrix} = \begin{bmatrix} d_0 \\ 0 \\ 0 \\ \cdots \\ 0 \end{bmatrix}$$

where:

$$\phi_k = \frac{1}{M-k} \sum_{i=1}^{M-k} y_i y_{i+k}; \text{ and}$$

$k = 0, 1, 2, \ldots, N.$

38. The system of claim 36 further including means for detecting inaccurate sensor data of a physical sensor positioned at a distal end of the sub-array and for substituting the computed first and second extrapolated-sensor data units of said first extrapolated-sensor for the inaccurate sensor data.

39. The system of claim 38 further including:

means for computing a first extrapolated-sensor data unit of a second extrapolated-sensor by extrapolation of the first extrapolated-sensor data unit of the first extrapolated-sensor and the first data processing units of at least a portion of the physical sensors of the sub-array; and means for computing a second extrapolated-sensor data unit of the second extrapolated-sensor by extrapolation of the second extrapolated-sensor data unit of the first extrapolated-sensor and the second data processing units of at least a portion of the physical sensors of the sub-array.

40. The system of claim 39 wherein said sensing system is implemented in a multibeam bathymetric, imaging or stereoscopic sonar system.

41. A method of reducing the effective beam width of a receive beam for a sensing system having a physical array of sensors, comprising:

measuring a receive signal for each sensor of the array of sensors, wherein each receive signal of each sensor includes a complex data set, including a real processing unit and an imaginary processing unit;

computing a complex data set, including a real data processing unit and an imaginary data processing unit, of a receive signal of at least one extrapolated-sensor by extrapolation of the complex data set of each receive signal of the physical sensors of the sensor array;

combining the complex data set of the receive signal of the at least one extrapolated-sensor to the complex data set of each receive signal of the physical sensors to narrow the effective beam width of a calculated receive beam.

42. The method of claim 41 further including computing a complex data set of each receive signal of each sensor of the array of sensors.

* * * * *